July 10, 1934.  T. M. ELFVING  1,966,003
REFRIGERATION
Original Filed Nov. 25, 1927
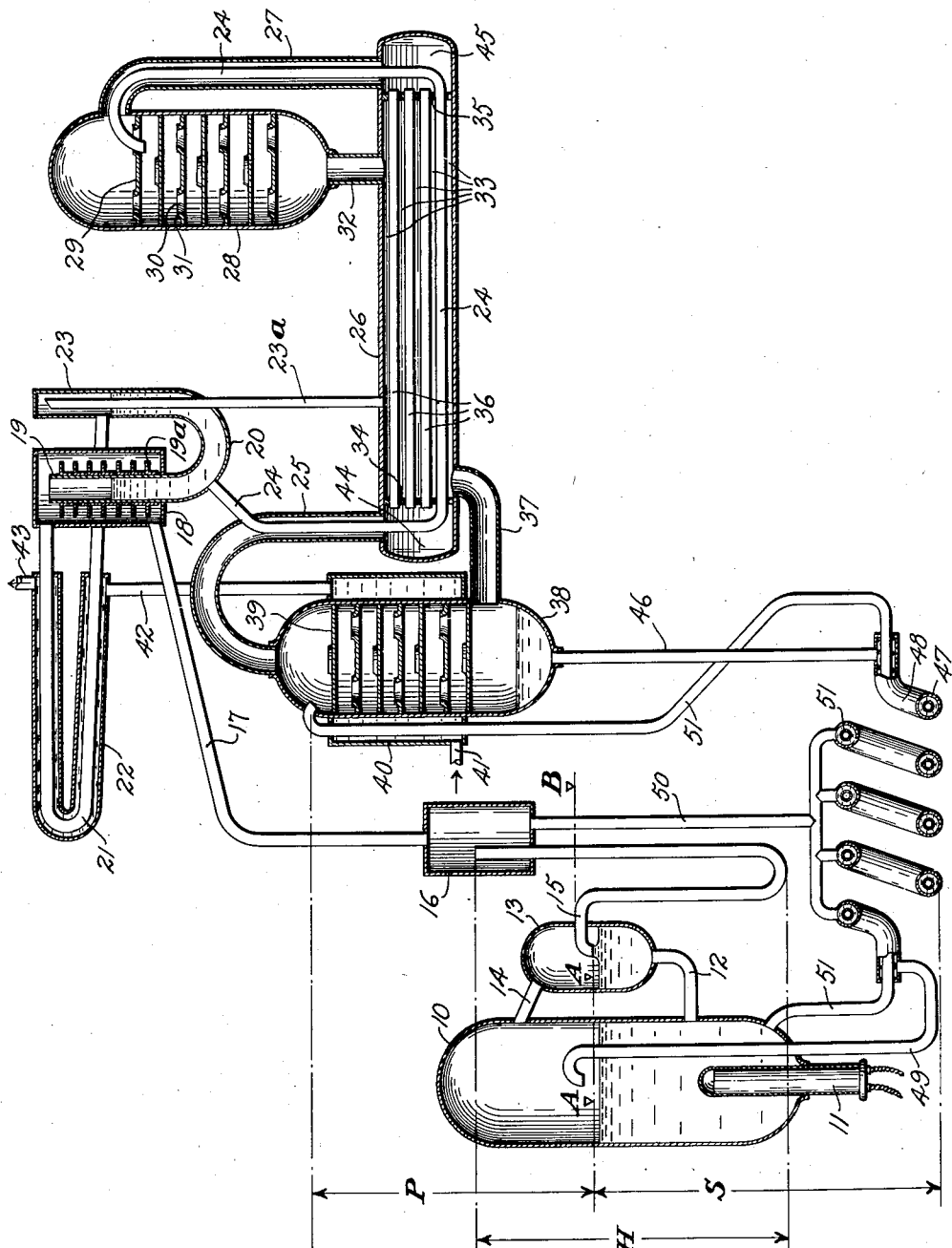
INVENTOR
Thore M. Elfving
BY
his ATTORNEY Patented July 10, 1934

1,966,003

UNITED STATES PATENT OFFICE 1,966,003

REFRIGERATION

Thore M. Elfving, Stockholm, Sweden, assignor to Electrolux Servel Corporation, New York, N. Y., a corporation of Delaware Application November 25, 1927, Serial No. 235,487. Renewed November 22, 1928. In Germany December 31, 1926

11 Claims. (Cl. 62—119.5)

My invention relates to refrigeration, and particularly to refrigerating systems of the absorption type, and still more particularly to absorption refrigerating apparatus wherein the circulation of fluids is effected by forces generated entirely within the system.

One of the objects of my invention is the utilization of an excess pressure periodically produced in the generator to periodically effect flow of absorption liquid from the generator to the absorber. Further objects and advantages will be apparent from the following description and accompanying drawing, which shows an elevational cross-sectional view of a preferred form of apparatus for carrying out the invention.

Referring to the drawing, reference character 10 designates a generator which is heated in any suitable manner, as by the electrical heating element 11. A conduit 12 connects the liquid space of generator 10 with the liquid space of an auxiliary vessel 13, while a conduit 14 connects the vapor spaces of these two members. The auxiliary vessel 13 may be considered as part of the generator. A conduit 15 extends horizontally for some distance within vessel 13 and thence downwardly for a short distance so that the opening in the end of the conduit is in a horizontal plane. From vessel 13 conduit 15 extends downwardly and thence upwardly and some distance within an intermediate or overflow vessel 16. The vertical length of conduit 15 measured from its upper end in vessel 16 to the bottom of the bend is designated by H.

A conduit 17 communicates with the upper part of overflow vessel 16 and the lower part of a rectifier member 18. One leg 19 of a U-shaped member 20 extends within member 18. Leg 19 is open at the top and is provided with a series of baffles 19ª. A condenser conduit 21 communicates with the upper part of rectifier member 18, extends in a generally downwardly direction within a water jacket 22 and communicates with leg 23 of U-shaped member 20. A conduit 24 communicates with the lower part of U-shaped member 20, extends within a conduit 25, a heat exchanger 26 and a conduit 27 to within the upper part of an evaporator 28.

Evaporator 28 comprises a closed cylindrical member in which is posited a series of disks 29. Disks 29 are formed with apertures 30 surrounded by raised rims 31. A conduit 32 connects the lower part of evaporator 28 with a space 33 formed within heat exchanger 26. Space 33 is included between tube heads 34 and 35 and around conduit 24 and tubes 36. A conduit 37 connects space 33 with the lower part of an absorber 38.

Absorber 38 comprises a closed cylindrical vessel in which is posited a series of disks 39 which may be similar to disks 29 in evaporator 28. Absorber 38 is partially surrounded by a water jacket 40. Cooling water is supplied to jacket 40 through a conduit 41 and discharged through a conduit 42 to water jacket 22, from where it is finally discharged through a conduit 43. A conduit 25 connects the upper part of absorber 38 with a space 44 formed in one end of heat exchanger 26. Tubes 36 connect space 44 with a similar space 45 formed in the other end of the heat exchanger. Conduit 27 connects space 45 with the upper part of evaporator 28.

A conduit 46 communicates with the bottom of absorber 38 and with an outer conduit 47 of coil-shaped heat exchanger 48. A conduit 40 communicates with the other end of outer conduit 47 and extends upwardly to within generator 10 above the level A. The upper end of conduit 49 is open and is preferably made in the form of a gooseneck. The vertical distance between the bottom of heat exchanger 48 and the level A is designated by S, as is shown on the drawing. A conduit 50 connects the bottom of overflow vessel 16 with the highest points of the successive turns of outer conduit 47. A conduit 51 communicates with the lower part of generator 10, extends within outer conduit 47, and within water jacket 40 and communicates with the upper part of absorber 38. The vertical distance between the level A and the highest point of conduit 51 is designated by P. For the apparatus to operate as intended, P must be less than either H or S, as will be explained later.

The apparatus operates as follows:

A solution consisting of a refrigerant, for instance, ammonia, dissolved in an absorbing medium, for instance, water, is contained in generator 10 and auxiliary vessel 13. Assume that this liquid in these vessels is at the level A, which is the highest point it reaches therein during the normal operation of the machine. The application of heat from heating element 11 serves to drive ammonia out of solution as a vapor. As the opening in conduit 15 within vessel 13 is at the level A, this opening is sealed by liquid, and as conduit 49 is partially filled with liquid there is no free means of egress for the vapor thus formed. Hence an excess pressure is built up in generator 10 and vessel 13. This pressure forces the liquid level below the level A in generator 10 and vessel 13, the liquid thus displaced passing out through conduits 15 and 51. Although the level has now fallen below the opening in conduit 15, liquid still passes into the conduit as the liquid adheres to the conduit due to capillary attraction. This adherence continues until the level has fallen between 2 and 3 millimeters below the opening in conduit 15. Thus a considerable volume of liquid passes into conduit 15, that is, 2 or 3 millimeters times the combined surface areas of generator 10 and vessel 13, less the volume required to raise the level in conduit 51 from A to B, which last volume is very small. The liquid thus forced into conduit 15 collects in the lower part thereof and forms a liquid seal.

Upon further increase in pressure the liquid level in generator 10 and vessel 13 falls further and the displaced liquid passes entirely through conduit 51 and finally overflows into absorber 38, while at the same time the liquid in conduit 49 is forced downwardly and the liquid in conduit 15 is forced more and more around the lower bend and upward toward overflow vessel 16. Thus the excess pressure in the generator is balanced by columns of liquid in conduits 49, 50, 46 and 51. The flow through conduit 51 continues until the level in generator 10 has fallen to such a point that the vertical distance between this point and the upper end of conduit 51 in absorber 38 is greater than the length of the liquid column in conduit 15. When this condition is reached, the column of liquid in conduit 15 is forced into overflow vessel 16 and, as there is now a free path from generator 10 and vessel 13 through conduit 15 to the other parts of the system, an equalization of pressure occurs throughout.

In order to make it possible for a pressure in generator 10 of sufficient value to force liquid through conduit 51 into absorber 28 to be balanced by liquid in conduits 15 and 50, it is necessary that P be less than H and S. Furthermore, to assure the discharge of liquid into overflow vessel 16 from conduit 15 rather than from conduits 49 and 50, it is necessary that S be greater than H.

After the liquid has been forced out of conduit 15 and an equalization of pressure has occurred, the liquid in vessel 16 and absorber 38 runs by gravity through conduits 50 and 46, respectively, to outer conduit 47 and thence through conduit 49 to generator 10. The entrance of this liquid displaces ammonia vapor from generator 10 and vessel 13. This ammonia vapor and some water vapor passes through conduit 15 to overflow vessel 16 and thence through conduit 17 to rectifier member 18. In member 18 the temperature of the vapor is reduced by liquid ammonia in leg 19 of U-shaped member 20 and the water vapor is condensed to liquid and flows back through conduit 17, vessel 16 and conduit 50 to conduit 47. The dry ammonia vapor passes from member 18 into condenser conduit 21, wherein it is condensed to a liquid by the cooling action of the water in jacket 22. The liquid ammonia thus formed passes into leg 23 of member 20. The height of the liquid level in member 20 is determined by the vertical relation of that member to the highest point of conduit 24 within evaporator 28. The liquid ammonia passes from member 20 through conduit 24 to the upper part of the evaporator. Any vapor or gas that has a tendency to collect in the upper part of leg 23 may pass therefrom through conduit 23ª.

In evaporator 28 the liquid ammonia is distributed over disks 29 and brought in intimate contact with a gas inert with respect to ammonia, for instance, hydrogen, which is introduced through conduit 27. The ammonia evaporates in the presence of and diffuses into the hydrogen and produces refrigeration in a known manner. The vaporous mixture of ammonia and hydrogen thus formed, having a greater specific weight than the relatively pure hydrogen admitted through conduit 27, passes downwardly through apertures 30 and through conduit 32 to space 33 in heat exchanger 26. The mixture traverses space 33 and passes therefrom through conduit 37 to the lower part of absorber 38.

In the absorber the mixture is brought in intimate contact with water having but relatively little ammonia in solution which is periodically introduced through conduit 51, as was previously described. This water is distributed in shallow pools on disks 39 and, although it flows intermittently in the absorber, there is always a sufficient quantity retained on these disks to effect absorption. The ammonia vapor is thus absorbed, while the lighter hydrogen passes upwardly through the absorber and through conduit 25 to space 44 in heat exchanger 26. From space 44 it passes through tubes 36 to space 45 and thence through conduit 27 to the upper part of evaporator 28. In heat exchanger 26 the ammonia in conduit 24 and the hydrogen in tubes 36 are precooled before entering the evaporator by the cold ammonia-hydrogen mixture in space 33 which has just come from the evaporator.

The strong solution of ammonia in water formed in the absorber periodically passes therefrom through conduit 46 as was previously explained. In liquid heat exchanger 48 this solution is preheated before entering generator 10 by the hot weak solution in inner conduit 51. This preheating may drive some of the ammonia out of solution and thus vapor would tend to collect in the upper part of each turn of heat exchanger 48. To prevent this possible formation of gas pockets conduit 50 communicates with the highest point of each turn. A further advantage gained by this arrangement is that a part of the ammonia vapor is shunted around the generator and hence the vapor that enters rectifier 18 is at a lower temperature than it would be if it all went through the generator.

The strong solution flows into generator 10 through conduit 49 until the level in generator 10 and vessel 13 has risen to A, whereupon the pressure in these vessels begins to increase again.

While I have shown and described a more or less specific embodiment of the invention, it is to be fully understood that I am not limited thereby, but that modifications fall within the spirit and scope of the invention.

Having thus described my invention, what I claim is:

1. Absorption refrigerating apparatus comprising a generator, an evaporator, an intermediate vessel, a conduit for flow of fluid from the intermediate vessel to the evaporator, means in said conduit for liquefying vapor, a conduit connecting said generator with said intermediate vessel having a reverse curve and a horizontal end opening in the generator, means to conduct liquid from the absorber and from the intermediate vessel to the generator, means for flow of fluid between the evaporator and absorber, and means to conduct liquid from the generator to the absorber.

2. Refrigerating apparatus comprising a generator, a condenser, an evaporator, an absorber, an intermediate vessel and an auxiliary vessel interconnected to form a system comprising high and low conduit connections between the generator and the auxiliary vessel, a conduit for conducting vapor from said intermediate vessel to said condenser constituting the sole means of supply of vapor to the condenser for condensation, a conduit connecting said auxiliary vessel with said intermediate vessel adapted, on variation of pressure and liquid level in the generator, to alternately conduct vapor and liquid from the auxiliary vessel to the intermediate vessel and a conduit for flow of liquid from the intermediate vessel to the generator, the arrangement being such that a rise of pressure in the generator above a given value causes liquid to pass into the intermediate vessel.

3. Refrigerating apparatus comprising a generator, a condenser, an evaporator, an absorber, an intermediate vessel and an auxiliary vessel interconnected to form a system comprising high and low conduit connections between the generator and the auxiliary vessel, a conduit for conducting vapor from said intermediate vessel to said condenser constituting the sole means of supply of vapor to the condenser for condensation, a conduit connecting said auxiliary vessel with said intermediate vessel adapted, on variation of pressure and liquid level in the generator, to alternately conduct vapor and liquid from the auxiliary vessel to the intermediate vessel and having a U-shaped bend therein and a conduit for flow of liquid from the intermediate vessel to the generator, the arrangement being such that a rise of pressure in the generator above a given value causes liquid to pass into the intermediate vessel.

4. Refrigerating apparatus comprising a generator, a condenser, an evaporator, an absorber, an intermediate vessel and an auxiliary vessel interconnected to form a system comprising high and low conduit connections between the generator and the auxiliary vessel, a conduit for conducting vapor from said intermediate vessel to said condenser, a conduit connecting said auxiliary vessel with said intermediate vessel and a conduit for flow of liquid from said intermediate vessel to said generator.

5. Refrigerating apparatus comprising a generator, a condenser, an evaporator, an absorber, a conduit for conveying liquid from said absorber to said generator, a conduit for conveying liquid from said generator to said absorber, said conduits arranged in heat exchange relation in the form of coils having horizontal axes and means to convey vapor from the upper part of each convolution of the coil made up of said first mentioned conduit to said condenser without passing through the generator.

6. Refrigerating apparatus comprising a generator, a condenser, an evaporator, an absorber, a conduit for conveying liquid from said absorber to said generator, a conduit for conveying liquid from said generator to said absorber, said conduits being arranged in heat exchange relationship, and means for conveying vapor from a plurality of points of the portion of the first mentioned conduit which is in heat exchange relationship to said condenser without passing through said generator.

7. Refrigerating apparatus comprising a generator, a condenser, an evaporator, an absorber, a conduit for conveying liquid from said absorber to said generator, means for heating said conduit to evolve vapor from the liquid therein, means for conveying said vapor from said conduit to said condenser without passing through said generator, and means for conducting vapor from the generator to said condenser without affecting flow of liquid from the absorber to the generator.

8. Refrigerating apparatus comprising a generator, a condenser, an evaporator, an absorber, a conduit for conveying liquid from said absorber to said generator, means for heating said conduit to evolve vapor from the liquid therein comprising a conduit for conveying liquid from said generator to said absorber in heat exchange relationship with the first mentioned conduit, means for conveying said vapor from said first mentioned conduit to said condenser without passing through said generator, and means for conducting vapor from the generator to said condenser without affecting flow of liquid from the absorber to the generator.

9. Refrigerating apparatus comprising a generator, a condenser, an evaporator, an absorber, said evaporator and absorber being connected for the circulation of a pressure equalizing gas therebetween, a conduit for conveying liquid from said absorber to said generator, means for heating said conduit to evolve vapor from the liquid therein, means for conveying said vapor from said conduit to said condenser without passing through said generator, and means for conducting vapor from the generator to said condenser without affecting flow of liquid from the absorber to the generator.

10. Refrigerating apparatus comprising a generator, a condenser, an evaporator, an absorber, said evaporator and absorber being connected for the circulation of a pressure equalizing gas therebetween, a conduit for conveying liquid from said absorber to said generator, means for heating said conduit to evolve vapor from the liquid therein comprising a conduit for conveying liquid from said generator to said absorber in heat exchange relationship with the first mentioned conduit, means for conveying said vapor from said first mentioned conduit to said condenser without passing through said generator, and means for conducting vapor from the generator to said condenser without affecting flow of liquid from the absorber to the generator.

11. Refrigerating apparatus comprising a generator, a condenser, an evaporator, an absorber, a vapor vessel, means to heat the generator to expel refrigerant from liquid therein, conduits forming a path of flow for liquid from the absorber to the generator, said path of flow having a plurality of places of vapor generation therein, at least one of said places of vapor generation communicating directly with said vapor vessel, a vapor connection between said vapor vessel and said condenser, and a direct vapor connection between said generator and said vapor vessel.

THORE M. ELFVING.